US011509876B2

(12) United States Patent
Wilson

(10) Patent No.: US 11,509,876 B2
(45) Date of Patent: Nov. 22, 2022

(54) HAND-HELD TURBINE CLEANER

(71) Applicant: ICA Turbine LLC, Glendale, AZ (US)

(72) Inventor: Eric Wilson, Glendale, AZ (US)

(73) Assignee: ICA Turbine LLC ( * ) Notice: Subject to any disclaimer, the term of this patent is extended or adjusted under 35 U.S.C. 154(b) by 318 days.

(21) Appl. No.: 16/889,147

(22) Filed: Jun. 1, 2020

(65) Prior Publication Data
US 2020/0296347 A1    Sep. 17, 2020

Related U.S. Application Data

(63) Continuation of application No. 15/690,522, filed on Aug. 30, 2017, now Pat. No. 10,708,569.

(Continued)

(51) Int. Cl.
| B24B 23/02 | (2006.01) |
| E04H 4/16 | (2006.01) |
| H04N 13/117 | (2018.01) |
| H04N 21/6587 | (2011.01) |
| H04N 21/81 | (2011.01) |
| H04N 21/24 | (2011.01) |
| H04N 21/2343 | (2011.01) |
| F03B 3/18 | (2006.01) |

(Continued)

(52) U.S. Cl.
CPC ........... *H04N 13/117* (2018.05); *B24B 23/02* (2013.01); *B24B 23/026* (2013.01); *E04H 4/16* (2013.01); *E04H 4/1618* (2013.01); *E04H 4/1645* (2013.01); *F03B 3/18* (2013.01); *F03B 15/06* (2013.01); *H04N 13/178* (2018.05); *H04N 13/194* (2018.05); *H04N 13/388* (2018.05); *H04N 21/23439* (2013.01); *H04N 21/2402* (2013.01); *H04N 21/6587* (2013.01); *H04N 21/816* (2013.01); *F03B 3/02* (2013.01); *F03B 3/06* (2013.01); *F05B 2220/70* (2013.01); *H04N 13/161* (2018.05); *H04N 13/373* (2018.05); *H04N 13/376* (2018.05); *H04N 13/378* (2018.05); *H04N 13/38* (2018.05)

(58) Field of Classification Search
CPC ......... B24B 23/02; B24B 23/026; E04H 4/16; E04H 4/1618; E04H 4/1636; E04H 4/1645
USPC ................................... 451/344, 354
See application file for complete search history.

(56) References Cited

U.S. PATENT DOCUMENTS

| 985,537 A | * | 2/1911 | O'Malley | ................. F04D 9/06 |
| | | | | 417/89 |
| 3,291,145 A | * | 12/1966 | Arneson | ................ E04H 4/1681 |
| | | | | 239/242 |

(Continued)

*Primary Examiner* — Eileen P Morgan
(74) *Attorney, Agent, or Firm* — Thomas W. Galvani, P.C.; Thomas W. Galvani

(57) ABSTRACT

A hand-held turbine cleaning tool includes front and rear housings coupled to each other, an outlet at one end of the tool, and a top of the tool at an opposed end. The outlet is directed in a first direction away from the top. An inlet is disposed between the outlet and the top and is also directed in the first direction. A diverter valve at the inlet is moveable between on and off positions. The on position directs water flowing into the inlet from the inlet, up to the top in a second direction opposite the first direction, and then down to the outlet in the first direction. A turbine at the top has a turbine shaft that extends outside the tool. An abrasive member is connected to the turbine shaft and is configured to rotate when water flows from the inlet to the outlet.

17 Claims, 4 Drawing Sheets

Related U.S. Application Data

(60) Provisional application No. 62/401,754, filed on Sep. 29, 2016.

(51) Int. Cl.
- *F03B 15/06* (2006.01)
- *H04N 13/178* (2018.01)
- *H04N 13/194* (2018.01)
- *H04N 13/388* (2018.01)
- *F03B 3/02* (2006.01)
- *F03B 3/06* (2006.01)
- *H04N 13/376* (2018.01)
- *H04N 13/378* (2018.01)
- *H04N 13/161* (2018.01)
- *H04N 13/38* (2018.01)
- *H04N 13/373* (2018.01)

(56) References Cited

U.S. PATENT DOCUMENTS

| | | | |
|---|---|---|---|
| 4,004,312 A * | 1/1977 | Eason | A46B 13/06 15/29 |
| 4,193,228 A * | 3/1980 | Bowler | E04H 4/1618 451/295 |
| 4,335,481 A * | 6/1982 | Slayman | A47L 11/4075 15/97.1 |
| 4,463,525 A * | 8/1984 | Sheber | B08B 1/04 15/23 |
| 4,558,479 A * | 12/1985 | Greskovics | E04H 4/1654 55/374 |
| 4,780,992 A * | 11/1988 | McKervey | A47L 11/4075 15/328 |
| 4,881,978 A * | 11/1989 | Van Horssen | E04H 4/1618 15/93.1 |
| 5,038,523 A * | 8/1991 | Farber | B24B 23/026 451/344 |
| 5,044,034 A * | 9/1991 | Iannucci | E04H 4/1636 15/387 |
| 7,288,022 B2 * | 10/2007 | Bacon | F01D 15/06 451/295 |
| 7,437,790 B1 * | 10/2008 | Ajello | E04H 4/1636 15/350 |
| 9,453,355 B1 * | 9/2016 | Rasp | E04H 4/1645 |
| 10,399,218 B2 * | 9/2019 | Elen | B24B 29/00 |
| 2006/0053572 A1 * | 3/2006 | Porat | C02F 1/4674 15/1.7 |
| 2006/0265820 A1 * | 11/2006 | Erlich | E04H 4/1636 15/1.7 |
| 2013/0146106 A1 * | 6/2013 | Erlich | B08B 9/08 134/34 |
| 2013/0341284 A1 * | 12/2013 | Michelon | E04H 4/16 210/85 |
| 2015/0059106 A1 * | 3/2015 | Rief | E04H 4/1663 180/429 |
| 2017/0356211 A1 * | 12/2017 | Rejniak | E04H 4/1654 |

\* cited by examiner

HAND-HELD TURBINE CLEANER

CROSS-REFERENCE TO RELATED APPLICATIONS

This application is a continuation of and claims the benefit of prior U.S. patent application Ser. No. 15/690,522, filed Aug. 30, 2017, which claims the benefit of U.S. Provisional Application No. 62/401,754, filed Sep. 29, 2016, all of which are hereby incorporated by reference.

FIELD

This invention relates in general to cleaning devices and, more particularly, to cleaning devices which harness hydro power from the pool pump and filter system's suction hose.

BACKGROUND

Although a great number of highly sophisticated and complex devices have been developed for cleaning the water in swimming pools, only a few rudimentary implements are available for removing the calcium and lime deposits, oils, grease, scum and the like which tend to build up on the tile walls of pools, along with plaster stains below the tile. These implements include pumice stones, hand-held scrub brushes, and various chemical cleansers or abrasives which the pool owner must rub onto the tile surface, generally while standing in the pool or while kneeling or crouching on its edge. Unfortunately, the laborious nature of this hand-scrubbing process tends to dissuade people from cleaning their tiles as frequently as they should. Thus, the layer of accumulated deposits becomes thicker and harder to remove with time, resulting in added labor and aggravation for the owner of the pool.

One prior art attempt to solve this problem is described in U.S. Pat. No. 4,004,312 to Eason, which relates to a tool for washing concrete surfaces and swimming pool walls. The tool of Eason includes a round brush member rotatable disposed within a hollow open-ended housing. A hollow tubing portion with a handle element formed at one end is affixed to the housing, with the longitudinal axis of the tubing.

U.S. Pat. No. 3,755,845 to Coult provides a frictional driven rotating cleaning apparatus wherein manual directing of the apparatus imparts rotation to an associated brush within the apparatus.

U.S. Pat. No. 396,473 to Bell uses a hand-held grill cleaner wherein a brush is rotatably mounted to a lowermost forward end of the apparatus.

U.S. Pat. No. 4,324,015 to Head sets forth a repositionable tile cleaner wherein the apparatus includes a housing mounted upon a castor for repositioning of the apparatus about the swimming pool apron, with a downwardly directed rotatable brush for cleaning of the pool tile.

U.S. Pat. No. 4,780,992 to McKervey provides an apparatus for swimming pool tile cleaning wherein a hand-held tool in the shape of a "L" configuration includes a downwardly directed rotatable brush for cleaning of tile adjacent swimming pool apron, with an injector organization to direct a cleaning fluid to the surface of the rotating brush.

Portion also includes a fitting for attaching a hose to communicate fluids thereto. To operate the tool, fluid from the hose is directed through the tubing element and on to a plurality of fin elements provided on the back of the brush member, imparting rotation thereto. One problem with Eason's device is that the angle of the brush member relative to the handle makes the tool more suitable for cleaning horizontal surfaces such as pool floors than for the vertical walls of a pool. Another problem with the device is that it requires attachment to a source of pressurized water, which increases the weight of the tool and limits the amount of distance over which the tool can be carried. Still another problem with the device is that it lacks versatility; i.e., it can only be used for cleaning certain types of surfaces, and thus may not merit its cost to the consumer.

U.S. Pat. No. 1,578,013 to Case, U.S. Pat. No. 4,202,068 to Lester et al, U.S. Pat. No. 4,208,753 to Lewis, and U.S. Pat. No. 4,237,570 to Brock. All of the above relate to tools having rotary brushes suitable for a wide variety of uses such as scrubbing and polishing of floors, utensils, and furniture, and cleaning the exterior surface of automobiles and airplanes. However, none of these prior art cleaning devices would be suitable for use on swimming pool tile, for a variety of reasons. For instance, a number of the devices are electrically powered, which makes them hazardous to use near water. Others are pneumatically or hydraulically powered, which requires connection to a remote source of pressurized air or water. In addition, the brush angles make them inconvenient for use on vertical walls. Still further, like the device of Eason, they are limited to a single basic function, and would cost more than their occasional use by a pool owner would justify.

As such, it may be appreciated that there continues to be need for a new and improved swimming pool tile and plaster stain cleaning apparatus which can be easily and efficiently manufactured and marketed.

SUMMARY

Generally, a hand-held tool uses a turbine to rotate an abrasive pad to clean plaster stains from pool tile. This embodiment is effective for removing especially thick solid deposits of calcium and plaster stains which do not respond to treatment with a bristle-type brush.

The above provides the reader with a very brief summary of some embodiments discussed below. Simplifications and omissions are made, and the summary is not intended to limit or define in any way the scope of the invention or key aspects thereof. Rather, this brief summary merely introduces the reader to some aspects of the invention in preparation for the detailed description that follows.

BRIEF DESCRIPTION OF THE DRAWINGS

Referring to the drawings.

Figure 1:
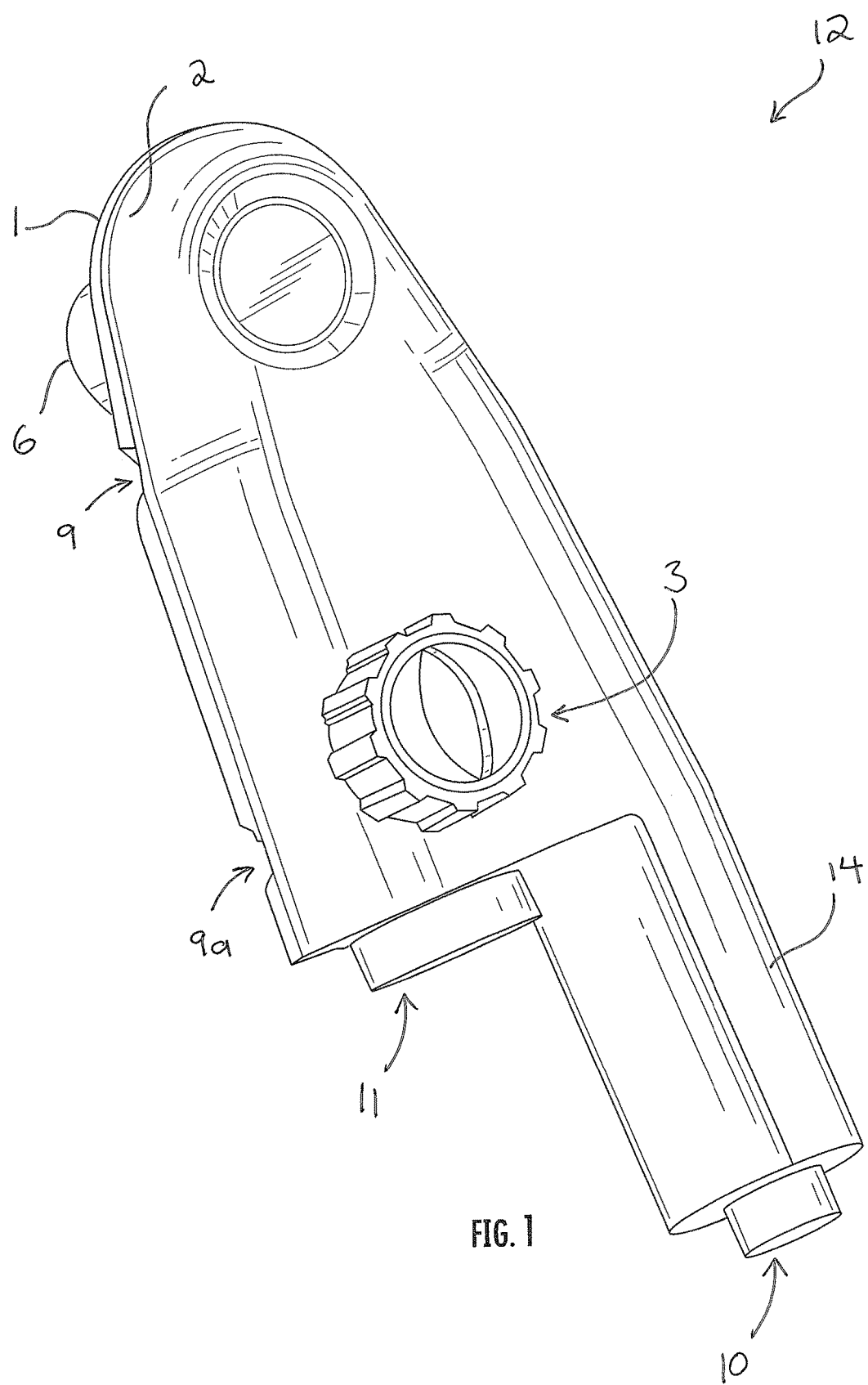
FIG. 1 is a rear perspective view of the hand-held turbine cleaning tool (12) with a three-way diverter valve in the "ON" position.
Figure 2:
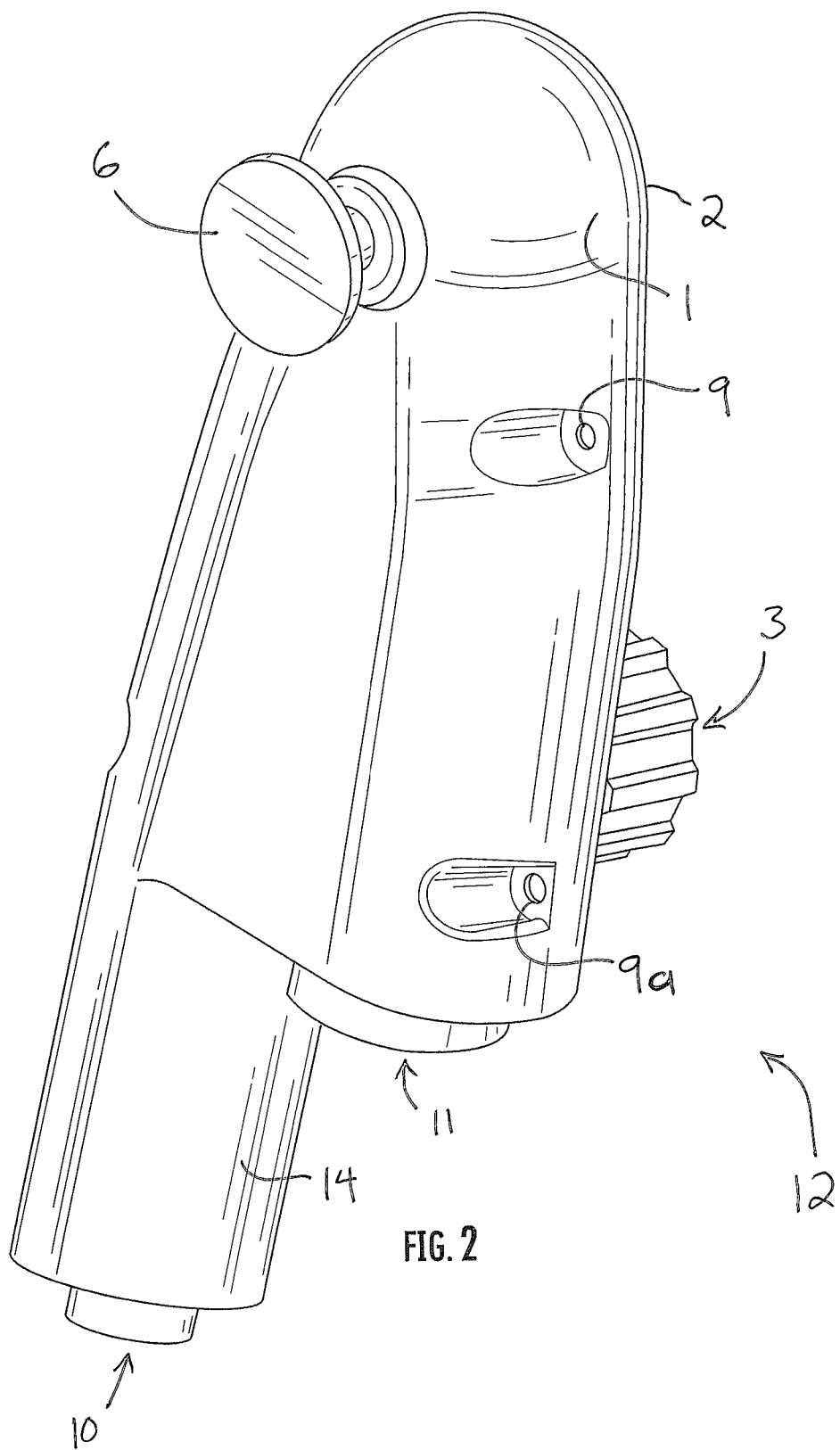
FIG. 2 is a front perspective view of the hand-held turbine cleaning tool (12) with a detachable abrasive member attached.
Figure 3:
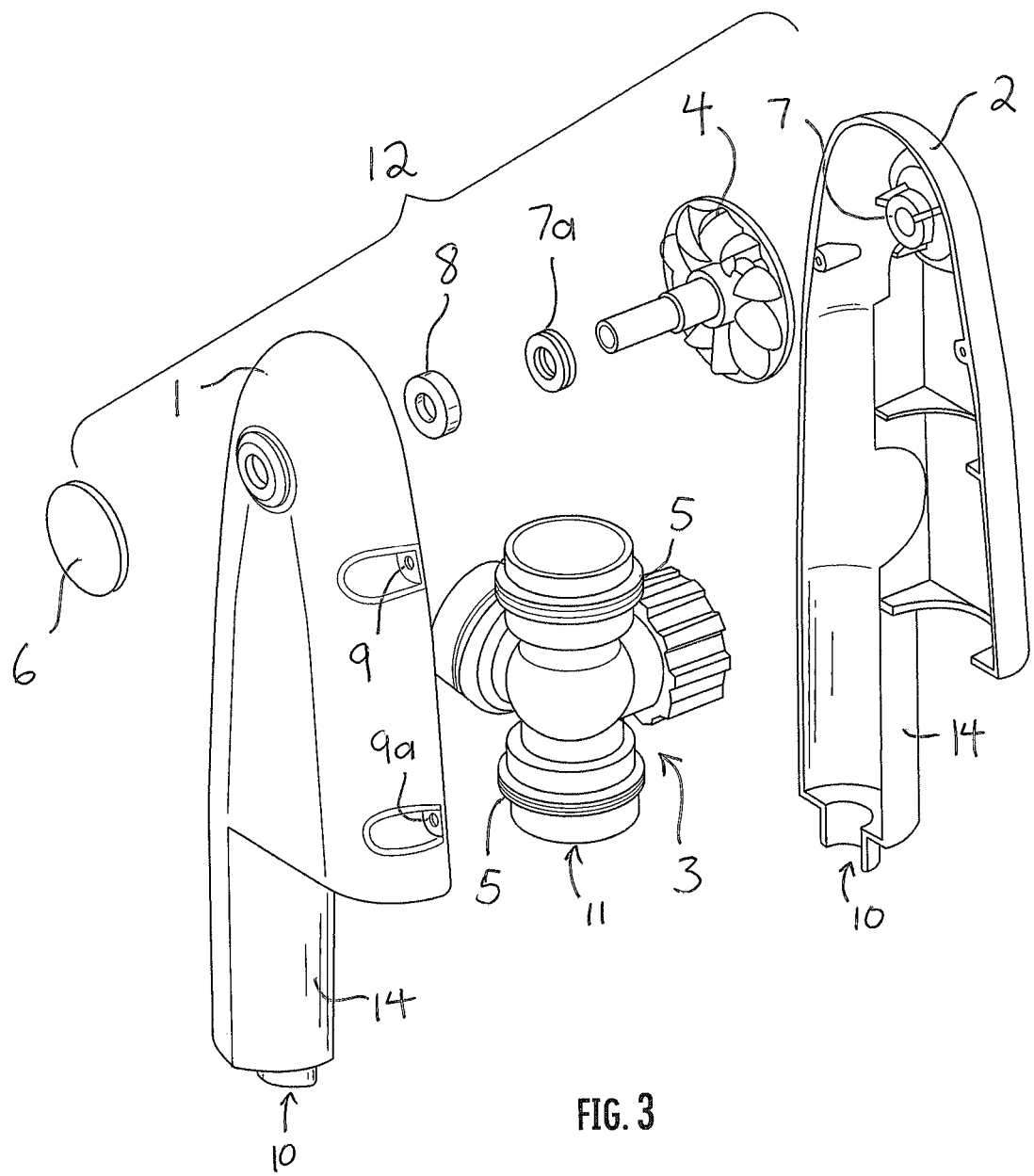
FIG. 3 is an exploded view showing the internal workings of the hand-held turbine cleaning tool, including a front housing (1) of the hand-held turbine cleaning tool, a rear housing (2) of the hand-held turbine cleaning tool, a three-way diverter valve (3), a turbine (4), a grommet (5), a detachable abrasive member (6), a rear turbine bearing (7), a front turbine bearing (7a), a silicone rubber seal (8), and self-tapping screw pilot holes (9 and 9a)
Figure 4:
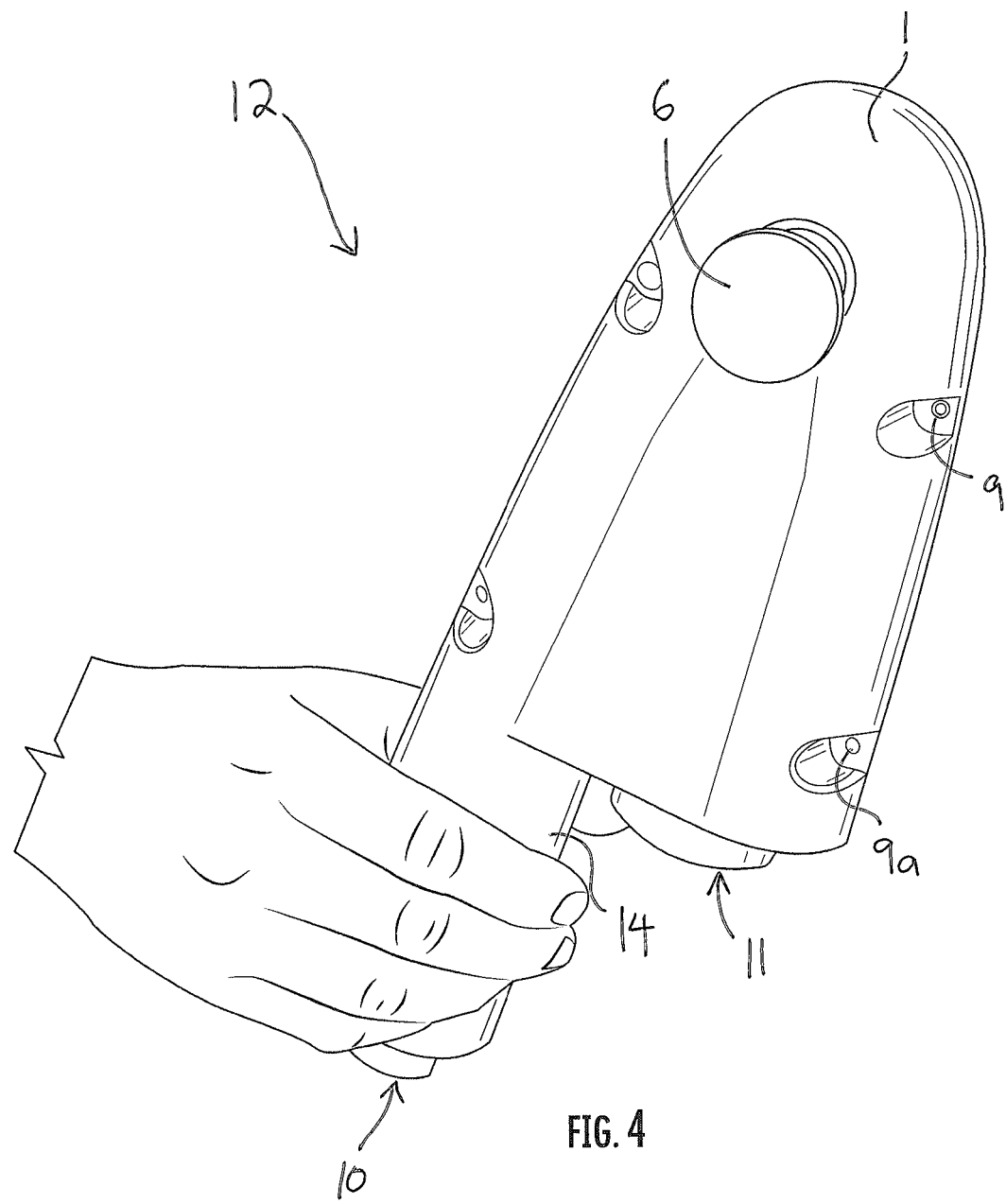
FIG. 4 is a front perspective view of the bottom of the invention with call-outs for hose connections. When the suction hose from the pool filter is applied to an outlet (10)

of the hand-held turbine cleaning tool (12), water is drawn up through a pool water intake or inlet (11), which activates rotation of the turbine (4).

DETAILED DESCRIPTION

Reference is now made to the drawings, in which the same reference characters are used throughout the different figures to designate the same elements. FIGS. 1 through 4 illustrate a new and improved hand-held turbine cleaning tool 12 (hereinafter "tool") which uses available water power of the pool pump and filter system and a detachable abrasive member 6 carried by the tool 12. As identified in the description of the drawings, the tool 12 includes a front housing 1, a rear housing 2, a three-way diverter valve 3 (such as a ball valve, butterfly valve, spear valve, gate valve, diaphragm valve, globe valve, check valve, and solenoid valve), a hydro or water turbine 4 (such as react turbines including a VLH turbine, Kaplan turbine, propeller turbine, bulb turbine, Straflo turbine, Tyson turbine, and Gorlov turbine, or impulse turbines including a waterwheel turbine, Pelton turbine, Turgo turbine, Crossflo turbine, Michell turbine, Banki turbine, Ossberger turbine, Jonval turbine, reverse overshot turbine, Archimedes screw turbine, and Barkh turbine), a grommet 5, a detachable abrasive member 6, a rear turbine bearing 7, a front turbine bearing 7a, a silicone rubber seal 8, and self-tapping screw pilot holes 9 and 9a.

The abrasive member 6 is adapted to be and is actually connected to a shaft of the hydro turbine 4. In this preferred embodiment, the abrasive member 6 is threaded directly into the hydro turbine 4 shaft housed in the tool 12. The abrasive member 6 may use various grades of abrasion and has a substantially cylindrical and/or flat outer surface. The abrasive member 6 is mounted on the drive shaft of the hydro turbine 4 and/or a chuck to secure the detachable abrasive member 6. This embodiment of the invention is effective for removing especially thick solid deposits of calcium and plaster stains which do not respond to treatment with a bristle-type brush.

To use the tool 12 for cleaning the vertical side tile walls of a swimming pool, it is most beneficial for the operator to stand in the pool in order for the abrasive member 6 to have direct contact with the surface being cleaned. It is preferred that the abrasive member 6 be above pool water level. A pool water intake hose is connected to the inlet 11, and a suction hose leading to the pool pump and filter system is connected to the outlet 10. The operator actuates the water-powered turbine 4 by controlling the three-way diverter valve 3 on the device in order to rotate the abrasive member 6. FIG. 1 illustrates the three-way diverter valve 3 in the "ON" position; when a suction hose extending from the pool pump and filter system is applied to the outlet 10 and the pump system is activated, the water is drawn up through a pool water intake hose connected to the pool water inlet 11. Water is drawn up through the inlet 11, into the tool 12 between the front and rear housings 1 and 2, up to an end of the tool 12 which is opposite the inlet 11 (and which is where the turbine 4 is located), and then back down and out the outlet 10, moving substantially parallel to and in an opposite direction to the water drawn into the tool 12 at the inlet 11. This movement of water activates the rotation of the turbine 4. The operator may control the RPM or revolutionary speed of the turbine with the three-way diverter valve 3, moving from a diverted position, in which the water is not passed up to the turbine The operator may then move the tool 12 slowly around the perimeter of the pool until the desired perimeter of the pool has been cleaned. In order to clean different types of surfaces, the operator may substitute different types of abrasive members 6 and may hold the tool handle 14 (as shown in hand in FIG. 4) in different positions relative to the surface. The interchangeable abrasive members 6 include various grade types for the removal of calcium build-up to polishing pool tile.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A hand-held cleaning tool comprising:
a front housing and a rear housing coupled to each other at pilot holes, the front and rear housing forming a tool body bounding an internal flow channel for directing water moving inside the tool body from an inlet to an outlet of the tool body when the tool is operating;
the outlet is at a first end of the tool, and a turbine is at an opposed second end of the tool, wherein the outlet has an opening which is axially oriented along a first direction away from the second end and is configured to be connected to a suction hose to pull the water through the internal flow channel when the tool is operating;
an inlet which has an opening which is axially oriented along the first direction away from the second end and is configured to be connected to a pool water intake hose to draw the water into the tool body and along the internal flow channel;
a valve located at the inlet, the valve moveable between an on position and an off position, wherein when the tool is operating and the valve is in the on position, water is first drawn through the opening of the inlet and the internal flow channel to the turbine along a second direction which is parallel to but opposite the first direction, and then from the turbine through the internal flow channel and the opening of the outlet along the first direction parallel to but opposite the second direction;
the turbine has a turbine shaft that extends outside the tool; and
an abrasive member is connected to the turbine shaft outside the tool and is configured to rotate in response to rotation of the turbine shaft and the turbine when water flows through the opening of the inlet and the internal flow channel to the turbine along the second direction and then from the turbine through the internal flow channel and the opening of the outlet along the first direction.

2. The tool of claim 1, further comprising a handle bounding a portion of the internal flow channel and spacing the outlet apart from the inlet along the first direction, wherein, when the tool is operating, water moving from the turbine through the internal flow channel and the opening of the outlet moves first from the turbine, then through the handle, and then through the opening of the outlet.

3. The tool of claim 2, wherein the outlet is located on the handle at the first end of the tool.

4. The tool of claim 3, wherein the handle spaces the outlet apart from the turbine further in the first direction than the inlet is spaced apart from the turbine.

5. The tool of claim 1, wherein the inlet and the outlet are both opposite the second end.

6. The tool of claim 1, wherein the abrasive member is rigidly connected to the turbine shaft.

7. A hand-held cleaning tool comprising:
   a front housing and a rear housing coupled to each other to form a tool body bounding an internal flow channel for directing water drawn moving inside the tool body from an inlet to an outlet of the tool body when the tool is operating;
   the outlet is at a first end of the tool, and turbine is at an opposed second end of the tool, wherein the outlet has an opening which axially oriented along a first direction away from the second end and is configured to be connected to a suction hose to pull the water through the internal flow channel when the tool is operating;
   an inlet disposed along the first direction between the second end and the outlet, having an opening with is axially oriented along the first direction away from the second end and is configured to be connected to a pool water intake hose to draw the water into the tool body and along the internal flow channel;
   a valve located at the inlet, the valve moveable between an on position and an off position, wherein when the tool is operating and the valve is in the on position, water is first drawn through the opening of the inlet and the internal flow channel to the turbine along a second direction which is parallel to but opposite the first direction, and then from the turbine through the internal flow channel and the opening of the outlet along the first direction parallel to but opposite the second direction directs water flowing into the inlet from the inlet, between the front and rear housings, up to the top in a second direction opposite the first direction, down to the outlet in the first direction,
   the turbine has a turbine shaft that extends outside the tool; and
   an abrasive member is connected to the turbine shaft outside the tool and is configured to rotate in response to rotation of the turbine shaft and the turbine when water flows through the opening of the inlet and the internal flow channel to the turbine along the second direction and then from the turbine through the internal flow channel and the opening of the outlet along the first direction.

8. The tool of claim 7, further comprising a handle bounding a portion of the internal flow channel and spacing the outlet apart from the inlet along the first direction, wherein, when the tool is operating, water moving from the turbine through the internal flow channel and the opening of the outlet moves first from the turbine, then through the handle, and then through the opening of the outlet.

9. The tool of claim 8, wherein the outlet is located on the handle at the first end of the tool.

10. The tool of claim 9, wherein the handle spaces the outlet apart from the turbine further in the first direction than the inlet is spaced apart from the turbine.

11. The tool of claim 7, wherein the inlet and the outlet are both opposite the second end.

12. The tool of claim 7, wherein the abrasive member is rigidly connected to the turbine shaft.

13. A hand-held cleaning tool comprising:
   a front housing and a rear housing coupled to each other, the front and rear housing forming a tool body bounding an internal flow channel for directing water moving inside the tool body from an inlet to an outlet of the tool body when the tool is operating;
   the outlet is at a first end of the tool, and a turbine is at an opposed second end of the tool, wherein the outlet has an opening which is axially oriented along a first direction away from the second end and is configured to be connected to a suction hose to pull the water through the internal flow channel when the tool is operating;
   an inlet which has an opening which is axially oriented along the first direction away from the second end and is configured to be connected to a pool water intake hose to draw the water into the tool body and along the internal flow channel;
   a handle configured to be held by a four-fingered hand, the handle bounding a portion of the internal flow channel and spacing the outlet apart from the inlet along the first direction, wherein, when the tool is operating, water moving from the turbine through the internal flow channel and the opening of the outlet moves first from the turbine, then through the handle, and then through the opening of the outlet;
   the turbine has a turbine shaft that extends outside the tool; and
   an abrasive member is connected to the turbine shaft outside the tool and is configured to rotate in response to rotation of the turbine shaft and the turbine when water flows through the opening of the inlet and the internal flow channel to the turbine along the second direction and then from the turbine through the internal flow channel and the opening of the outlet along the first direction.

14. The tool of claim 13, wherein the outlet is located on the handle.

15. The tool of claim 14, wherein the handle spaces the outlet apart from the turbine further in the first direction than the inlet is spaced apart from the turbine.

16. The tool of claim 13, wherein the inlet and outlet are both opposite the second end.

17. The tool of claim 13, wherein the abrasive member is rigidly connected to the turbine shaft.

* * * * *